United States Patent
Merkel et al.

(10) Patent No.: US 8,829,471 B1
(45) Date of Patent: Sep. 9, 2014

(54) TECHNIQUES FOR SPATIAL SPECTRAL HOLOGRAPHY

(75) Inventors: Kristian D. Merkel, Bozeman, MT (US); Colton Richard Stiffler, Bozeman, MT (US); Alex Woidtke, Bozeman, MT (US); Aaron Traxinger, Bozeman, MT (US); Randy W. Equall, Bozeman, MT (US); Zeb Barber, Bozeman, MT (US); Calvin Harrington, Bozemen, MT (US); Krishna Mohan Rupavatharam, Bozeman, MT (US); Charles W. Thiel, Bozeman, MT (US); Rufus Cone, Bozeman, MT (US)

(73) Assignees: Montana State University, Bozeman, MT (US); S2 Corporation, Bozeman, MT (US)

( * ) Notice: Subject to any disclaimer, the term of this patent is extended or adjusted under 35 U.S.C. 154(b) by 119 days.

(21) Appl. No.: 13/487,577

(22) Filed: Jun. 4, 2012

Related U.S. Application Data

(60) Provisional application No. 61/492,773, filed on Jun. 2, 2011.

(51) Int. Cl.
 *C09K 11/77* (2006.01)
 *G02B 5/00* (2006.01)
 *G01N 21/64* (2006.01)
(52) U.S. Cl.
 CPC ............... *G02B 5/003* (2013.01); *G01N 21/64* (2013.01)
 USPC ...................................... 250/458.1
(58) Field of Classification Search
 USPC ...................................... 250/458.1
 See application file for complete search history.

(56) References Cited

U.S. PATENT DOCUMENTS

| 4,459,682 A | 7/1984 | Mossberg |
| 4,670,854 A | 6/1987 | Mossberg |
| 5,239,548 A | 8/1993 | Babbitt et al. |

(Continued)

FOREIGN PATENT DOCUMENTS

| WO | WO03/098384 | 11/2003 |

OTHER PUBLICATIONS

U.S. Appl. No. 11/556,751, filed Sep. 27, 2007, William R. Babbitt.

(Continued)

*Primary Examiner* — David Porta
*Assistant Examiner* — Hugh H Maupin
(74) *Attorney, Agent, or Firm* — Evans & Molinelli PLLC; Eugene J. Molinelli

(57) ABSTRACT

Techniques for spatial spectral holography include a doped crystal comprising Thulium doped into a host crystal of Yttrium Lutetium Aluminum Garnet wherein a concentration of Thulium atoms is less than 3 atomic percent. Techniques further include an apparatus with a source for optical electromagnetic radiation and a cryocooler configured to maintain an operating temperature in a range from about 3 Kelvin to about 6 Kelvin. The cryocooler includes a first optical window. The apparatus also includes a doped crystal comprising Thulium doped into a host crystal of Yttrium Lutetium Aluminum Garnet disposed inside the cryocooler in a position to be illuminated by incident optical electromagnetic radiation derived from the source. The apparatus also includes a detector configured to detect optical electromagnetic radiation emitted from the doped crystal. Techniques include a method for using at least one of the above doped crystals.

10 Claims, 6 Drawing Sheets

(56) References Cited

U.S. PATENT DOCUMENTS

| | | | |
|---|---|---|---|
| 6,407,831 | B1 | 6/2002 | Cone et al. |
| 6,516,014 | B1 | 2/2003 | Sellin |
| 6,654,394 | B1 * | 11/2003 | Sellin et al. .................... 372/32 |
| 6,680,860 | B1 | 1/2004 | Merkel et al. |
| 7,145,713 | B2 | 12/2006 | Chang |
| 7,193,879 | B2 | 3/2007 | Merkel |
| 7,265,712 | B2 | 9/2007 | Merkel |
| 7,307,781 | B1 | 12/2007 | Chang |
| 7,379,652 | B2 | 5/2008 | Cole |
| 7,391,550 | B2 | 6/2008 | Harris |
| 2004/0131179 | A1 * | 7/2004 | Ichimura et al. ............... 380/28 |
| 2010/0005066 | A1 | 1/2010 | Howard |
| 2010/0127148 | A1 | 5/2010 | Woidtke |
| 2012/0002972 | A1 | 1/2012 | Stiffler |
| 2012/0140236 | A1 | 6/2012 | Babbitt et al. |

OTHER PUBLICATIONS

R, Cone, Persistent Spectral Hole Burning Materials for Time-and Frequency-Domain Optical Memories and Signal Processing, Final Technical Report for Sep. 30, 1994 to Sep. 29, 1997, Jul. 18, 1998, pp. 1-28, Published in: Montana State University, Bozeman, MT.

R, Cone, Materials Development for Demonstration and Prototype for Analog Signal Processing Applications, 2005, pp. 1-9.

N, Ohlsson, et al., Long-time-storage mechanism for Tm: YAG in a magnetic field, Optics Letters, 2003, pp. 450-452, vol. 28, No. 6, Publisher: Optical Society of America, Published in: http://www.opticsinfobase.org/ol/abstract.cfm?uri=ol-28-6-450.

Y.C. Sun, Rare Earth Materials in Optical Storage and Data Processing Applications, 2005, pp. 379-429, vol. 83, Publisher: Springer Berlin Heidelberg, Published in: http://link.springer.com/chapter/10.1007%2F3-540-28209-2_7?LI=true.

Y, Sun, et al., Optical decoherence and energy level structure of 0.1% Tm3+: LiNbO3, Phys. Rev. B 85, 165106, 2012, pp. 1-13, vol. 85, No. 16, Publisher: American Physical Society, Published in: http://prb.aps.org/abstract/PRB/v85/i16/e165106.

C.W. Thiel, et al., Optical Decoherence, Spectral Diffusion, and 169Tm Hyperfine Structure of Tm3: LiNbO3 at 794nm for Quantum Computing . . . , Aug. 2008, pp. 1-16, Published in: OpTeC Conference, Bozeman, Montana.

C.W. Thiel, et al., Optical decoherence and persistent spectral hole burning in Tm3+: LiNbO3, Journal of Luminescence, 2010, pp. 1598-1602, vol. 130, No. 9, Publisher: Elsevier, Published in: http://www.sciencedirect.com/science/arlicle/pii/S0022231309006218.

C.W. Thiel, et al., Rare-earth-doped materials for applications in quantum information storage and signal processing, Journal of Luminescence, 2011, pp. 353-361, vol. 131, Publisher: Elsevier, Published in: www.elsevier.com/locate/jlumin.

* cited by examiner

FIG. 4

| | | | | | | | | |
|---|---|---|---|---|---|---|---|---|
| Physical and Spectroscopic Properties | Thulium Dopant concentration | | 0.05 | [1,2] | 3.00 | [1,2] | 0.10 | [1,3,5] | at. % |
| | Host Yttrium concentration | | 100 | [1,2] | 50 | [1,2] | 0 | [1,3,5] | % |
| | Host Lutetium concentration | | 0 | [1,2] | 50 | [1,2] | 0 | [1,3,5] | % |
| | Host Lithium Niobate concentration | | 0 | [1,2] | 0 | [1,2] | 100 | [1,3,5] | % |
| | Atomic Transition Used | | 3H4-3H6 | [1,2] | 3H4-3H6 | [1,2] | 3H4-3H6 | [1,3,5] | nm |
| | Center Wavelength of Transition | | 793.377 | [1,2] | 793.808 | [1,2] | 794.220 | [1,3,5] | nm |
| | Oscillator Strength | | 80 | [1,2] | 50 | [2] | 2000 | [1,3,5] | ×10$^{-9}$ |
| | Absorption Bandwidth | | 17 | [1,2] | 270 | [1,2] | 300 | [1,3,5] | GHz |
| | Absorption coefficient | | 0.95 | [1,2] | 3.8 | [1,2] | 14.7 | [1,3,5] | cm-1 |
| | Branching ratio upper to bottleneck | | 59 | [1,2] | ~100 | NEW | 27 | [3,5] | % |
| | Upper state "lifetime" with 3PE, B=0 | | 0.80 | [1,2] | 0.80 | [1,2] | 0.16 | [3,5] | msec |
| | Bottleneck state "lifetime" w/ 3PE, B=0 | | 10 | | 17 | NEW | 4.5 | [3,5] | msec |
| Coherence Properties | Measurement w/ B=0 G | T [K] | Tw [ms] | 8% Ex. [GHz] | | | | | |
| | RBW 2PE | <2.0 | 0 | 0 | <4 | [1] | 6 | [1,2,4] | | |
| | RBW 2PE | ~3.5 | 0 | 0 | 7 | NEW | 18-22 | NEW | 29 | kHz |
| | RBW 3PE | ~3.5 | 0.1 | 0 | 18 | NEW | 42 | NEW | 187 | kHz |
| | RBW 3PE | ~3.5 | 1 | 0 | 28 | NEW | 52 | NEW | >187 | kHz |
| | RBW 3PE | ~3.5 | 10 | 0 | 43 | NEW | 63 | NEW | >187 | kHz |
| | RBW-B 3PE | ~3.5 | 0.5 | 0 | 10 | NEW | 30 | NEW | >187 | kHz |
| | RBW-B 3PE | ~3.5 | 0.5 | 1 | 40 | NEW | 180 | NEW | unknown | kHz |
| | RBW-B 3PE | ~3.5 | 0.5 | 2 | 51 | NEW | 205 | NEW | unknown | kHz |

TECHNIQUES FOR SPATIAL SPECTRAL HOLOGRAPHY

STATEMENT OF GOVERNMENTAL INTEREST

This invention was made with Government support under Contract No. HQ0006-10-C-7209 awarded by the Missile Defense Agency, and under Contract No. W9113M-10-C-0070 awarded by the U.S. Army Space and Missile Defense Command. The Government has certain rights in the invention.

CROSS-REFERENCE TO RELATED APPLICATIONS

This application claims benefit of Provisional Appln. 61/492,773, filed Jun. 2, 2011, the entire contents of which are hereby incorporated by reference as if fully set forth herein, under 35 U.S.C. §119(e).

BACKGROUND OF THE INVENTION

A wide variety of applications, such as signal analysis, signal processing, spectroscopy and others, are enabled by the use of an appropriate light absorbing material, commonly known as a spatially and spectrally selective holographic (SSH or S2) material or an inhomogeneously broadened transition (IBT) material. The material can be used in a variety of useful modes. In many applications, the SSH material is used to record a target analog spectrum in the frequency domain for the signal or signals of interest (SOIs) to be processed. The spectrum of one or more signals is made to interact with the SSH material by having them be modulated onto an optical laser carrier such that the modulated optical spectrum is resonant with the atomic absorbers in the SSH material. A modulated optical spectrum can represent either inherent optical information or radio frequency/microwave, millimeter wave information that is purposely imposed by modulating onto an optical laser carrier with an electro-optical modulator. The analog spectrum can be phase-sensitive in certain applications and conditions. Combinations of phase-sensitive analog spectra (e.g., multiplications) can result in correlative signal processing, data storage, or signal processing (e.g., see U.S. Pat. Nos. 7,265,712, and 7,307,781 and 7,471,224, the entire contents of each of which are hereby incorporated by references as if fully set forth herein).

SUMMARY OF THE INVENTION

Materials, apparati and methods are provided for spatial spectral holography.

In one set of embodiments, a doped crystal comprises Thulium doped into a host crystal of Yttrium Lutetium Aluminum Garnet wherein a concentration of dopant Thulium atoms is less than 3 atomic percent.

In another set of embodiments, an apparatus includes a source for optical electromagnetic radiation and a cryocooler configured to maintain an operating temperature in a range from about 3 Kelvin to about 5 Kelvin. The cryocooler includes a first optical window configured to allow optical electromagnetic radiation to pass into the cryocooler. The apparatus also includes a doped crystal comprising Thulium doped into a host crystal of Yttrium Lutetium Aluminum Garnet disposed inside the cryocooler in a position to be illuminated by incident optical electromagnetic radiation derived from the source. The apparatus also includes a detector configured to detect optical electromagnetic radiation emitted from the doped crystal.

In another set of embodiments, a method comprises mounting a doped crystal in a cryocooler, wherein the doped crystal comprises Thulium doped into a host crystal of Yttrium Lutetium Aluminum Garnet. The method further comprises maintaining inside the cryocooler an operating temperature in a range from about 3 Kelvin to about 5 Kelvin. The method also comprises causing the doped crystal to be illuminated by incident optical electromagnetic radiation derived from a source. The method still further includes detecting optical electromagnetic radiation emitted from the doped crystal.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 is a table that illustrates example measurements of material properties of example materials, according to an embodiment;

DETAILED DESCRIPTION

Figure 1:
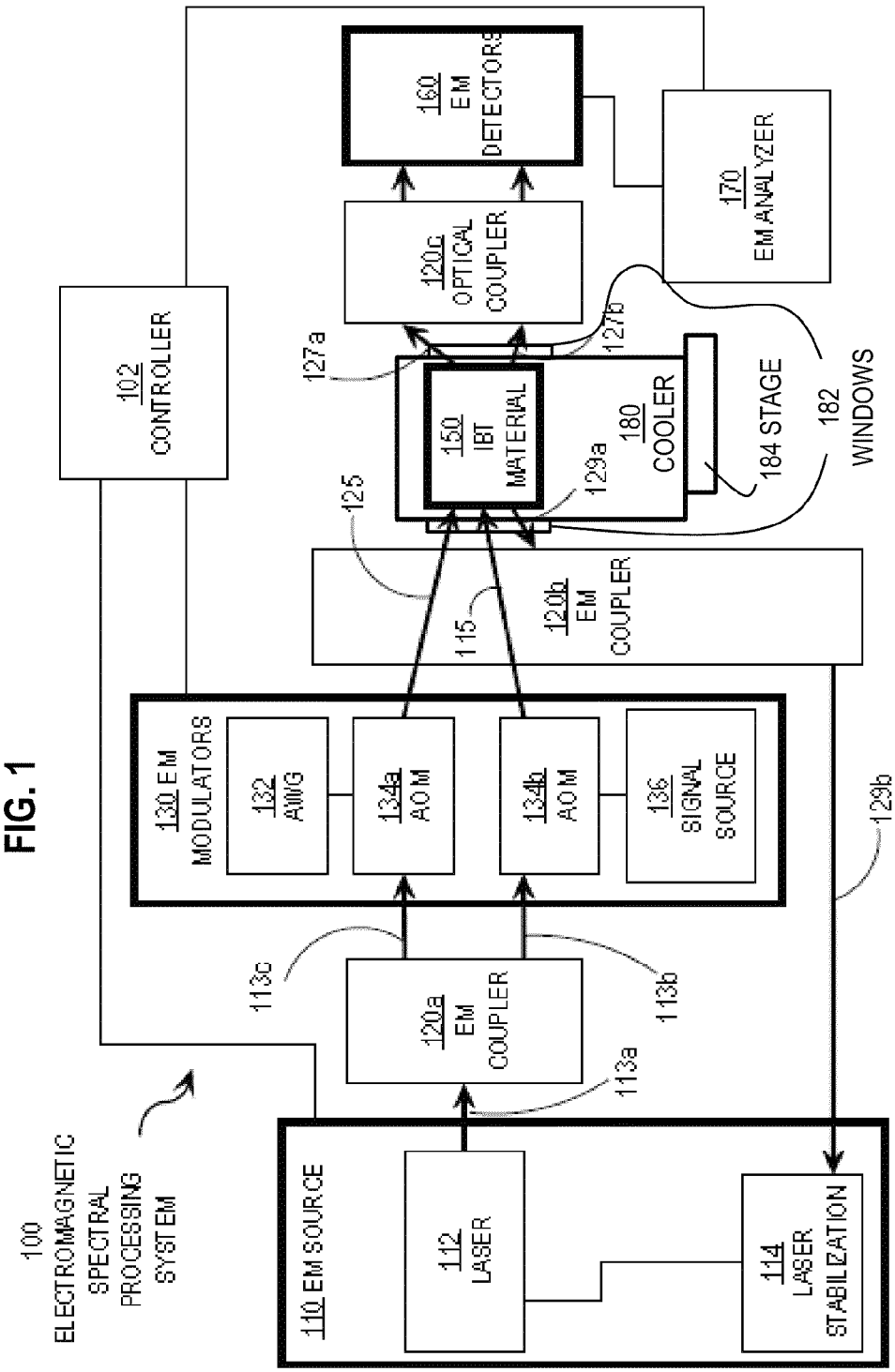
FIG. 1 is a block diagram that illustrates components of an optical system for storing spectral features and reconfiguring an SSH material, according to an embodiment.

Techniques are described for spatial spectral holography. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Some embodiments of the invention are described below in the context of a doped crystal with 3 atomic percent (at. %) Thulium dopant in Yttrium Lutetium Aluminum Garnet (YLuAG). However, the invention is not limited to this context. In other embodiments doped crystals are used with substantially less than 3 at. % Thulium dopant in YLuAG Overview A new spatially and spectrally selective holographic (SSH) material has been discovered for signal processing applications, as characterized with useful and non obvious properties. The material is Thulium doped into a host of Yttrium Lutetium Aluminum Garnet, $Tm^{3+}:Y_{3-x}Lu_xAl_5O_{12}$, where x~1.5 or typically between 0.1-2.9. This is also referred to as $Tm^{3+}$:YLuAG or Tm:YLuAG, hereinafter. The addition of Lutetium in place of some Yttrium in the host gives broadening of the inhomogeneous absorption line. For example, when x=1.5, the material exhibits a large full width at half maximum absorption bandwidth of 270 gigHertz (GHz, 1 GHz=$10^9$ Hertz, 1 Hertz, Hz,=one cycle per second) for a Thulium dopant level of 3.0 atomic percent (3.0 at. %). Other material properties of interest are specified for dopant densities in the range of approximately 0.1-3.0 atomic percent (at. %) of Tm, specifically: (1) having an optical absorption strength sufficient for signal processing applications while allowing for practical optical path lengths in physical samples (approximately 0.1-15 centimeter in length, 1 centimeter, cm,=$10^{-2}$ meters); (2) being able to grow crystals with high spatial quality to minimize undesired optical scattering; (3) having a center absorption wavelength of about 793.8 nm; (4) exhibiting desirable coherent optical qualities at a temperature of operation of about 4 Kelvin (K), including (4a) a lifetime of the upper state atomic transition of about 1 millisecond (ms, 1 ms=$10^{-3}$ seconds), (4b) a high branching ratio to a bottleneck state with a long lifetime of about 17 ms in the absence of any applied magnetic field, (4c) an inherent spectral resolution of less than 25 kiloHertz (kHz, 1 kHz=$10^3$ Hz), (4d) being able to maintain a spectral resolution of less than 1 megaHertz (MHz, 1 MHz=$10^6$ Hz) under practical conditions of atomic population storage time and wideband excitation, and (4e) being able to exhibit these properties uniformly across the absorption band.

The SSH material has been characterized to date with a dopant level of Thulium for 3.0 at. % into a host of $Y_xLu_{(3-x)}$AG, where x=1.5 (or when the mixture of Y and Lu is 50-50%). Based on the new measurements made herein, a range of Thulium dopant level equal to and lower than 3.0 at. % is anticipated to be useful, and lower concentrations than 3 at. % are determined to be advantageous by exhibiting coherence parameters better than those measured. The advantageous specifications for the lower Tm dopant levels can be optimized by further experimentation. Varying the Y and Lu mixture is anticipated to tune the bandwidth to be narrower than $Y_{1.5}Lu_{1.5}$AG for both x greater than 1.5 and x less than 1.5 as compared to x=1.5, where the bandwidth will be significantly wider than Tm:YAG for $Y_xLu_x$AG under the conditions when approximately 0.1<x<2.9.

Apparatus Overview

FIG. 1 is a block diagram that illustrates components of an optical system 100 for processing and storing spectral content and reconfiguring atomic state populations in an SSH material, according to an embodiment. Although a certain number of components are shown in FIG. 1 for the purposes of illustration, in other embodiments more or fewer components are included in system 100. Furthermore, the components described here refer to operation for optical frequencies. In other embodiments, other equivalent or corresponding components for other electromagnetic phenomena, such as nuclear magnetic resonance (NMR) replace or add to the components described with reference to FIG. 1.

Electromagnetic spectral processing system 100 includes a controller 102, one or more electromagnetic (EM) source 110, electromagnetic couplers 120a, 120b, 120c (collectively referenced hereinafter as couplers 120), electromagnetic modulators 130, two-atomic-state material (e.g., an SSH material such as IBT material 150) in cooler 180, electromagnetic detectors 160, and post-detection electronics, such as electromagnetic signal analyzer 170.

In the illustrated embodiment 100, EM source 110 includes an input laser 112 and a laser stabilization block 114. This laser 112 provides stabilized optical carrier frequency beams 113a in the TeraHertz range (THz, 1 THz=$10^{12}$ cycles per second) used to carry a target optical spectrum and a chirped laser field used as a probe waveform and a population reconfiguration waveform. In some embodiments, a single laser provides the carrier frequency beam 113a for both the target optical spectrum and probe signals. In some embodiments, additional laser sources are included in EM source 110. In various embodiments, electric signals from laser stabilization block 114 controls frequency, amplitude or phase, or some combination, for laser 112. Propagation of EM waveforms is indicated in FIG. 1 by straight arrows. Electronic connections for signal processing and control are represented by segmented lines without arrowheads.

The EM couplers 120 direct EM waveforms, such as optical beam 113a, between the various components and include not only air and empty space but also such optical couplers as mirrors, phase plates, optical fibers, among others well known in the art of optics and electromagnetic propagation. In the illustrated embodiment, EM coupler 120a splits carrier beam 113a into two carrier beams 113b, 113c at the same optical frequency.

The EM modulators 130 modulate the carrier frequency beams to produce signal beams with rich frequency content. In the illustrated embodiment, EM modulators 130 include input signal source 136, acousto-optic modulators (AOMs) 134a, 134b (collectively referenced hereinafter as AOMs 134) and arbitrary waveform generator (AWG) 132. In some embodiments, one or more AOMs 134 are replaced with or added to other optical modulators such as one or more electro-optic phase modulators (EOPMs), electro-optic amplitude modulators, and electro-absorption modulators. In some embodiments, AWG 132 is replaced by or added to other wave generators, such as one or more pulse pattern generators.

The input signal source 136 is any combination of components that generate a target electromagnetic spectrum to be placed on an optical carrier for use in system 100. For example, input signal source 136 is a radio frequency signal to be analyzed, such as a radar pulse or its reflected return, or both, as described in published International Patent application WO 2003/098384 entitled "Techniques for processing high time-bandwidth signals using a material with inhomogeneously broadened absorption spectrum, Inventors: K. D. Merkel, Z. Cole, K. M. Rupavatharam, W. R. Babbitt, T. Chang and K. H. Wagner, 27 Nov. 2003 (hereinafter Merkel). The input signal source 136 is an electronic signal, such as a voltage. AOMs 134 are used to modulate the optical carrier 113b from input laser 112 in proportion to the sign and magnitude of an applied radio frequency (RF) voltage. This produces an encoded optical field 115 with a target optical spectrum. In other embodiments, other modulators are used in place of or in addition to AOMs 134 to produce optical field 115 encoded in frequency or amplitude or both with the target optical spectrum. In other embodiments, multiple modulated laser beams 115 in one or more directions interact to form the optical target optical spectrum.

The AWG 132 generates a arbitrary reference waveform, such as chirped radio frequency waveform (such as a linear radio-frequency chirp) of bandwidth B around a carrier radio frequency. The AOM 134a imposes this same reference waveform on the laser carrier beam 113c, e.g., to produce one or more chirped laser fields 125 starting at an optical frequency ($\omega s$). In other embodiments, the laser 112 can create the reference waveform, such as an optical chirp, and no external modulator scheme, such as the combination of components 134a and 132, is needed or used. The single direction of the depicted optical field 115 is called a collinear geometry, which records only the spectral content of the signal. In some embodiments, various angled beam geometries are used, in which the signal 115 consists of multiple beams impinging on the two-state material (e.g., an SSH material IBT such as material 150) in different directions.

The EM two-atomic-state material, (e.g., an SSH materials such as IBT material 150) records one or more EM fields 115 that impinge on the material with sufficient intensity and duration. An appropriate light absorbing SSH material can be used as the IBT material in a variety of modes. The SSH materials that are used in many applications are intended to record an analog spectrum in the frequency domain for the target analog signal of interest (SOI) to be processed. The analog spectrum can be phase-sensitive in certain applications, and combinations of phase-sensitive analog spectra (e.g., multiplications) can result in correlative signal processing. The desirable SSH material should exhibit a combination of desirable properties, including high spatial quality, wavelength of operation, optical absorption strength, temperature of operation, lifetime of the atomic transition, bandwidth of operation, and resolution bandwidth of operation.

The materials known to date, outside the current work, are typically a rare earth element doped into a host material, where the host material is typically a crystalline structure. The materials known presently, outside the current work, that do exhibit a proper combination of these properties for practical operation are in the public domain and are quite limited. Such known materials have the desirable properties only at very low temperatures. Consequently the SSH material is contained in a cooler 180, such as a liquid Helium cooler or cryocooler. The cooler 180 includes one or more optical windows 182 so that optical waveforms may impinge the material and optical waveforms emitted from the material can be detected. As used herein an optical window includes an transparent portion of a wall of the cooler 180 or optical fiber penetrating the wall of the cooler 180, or some other known mechanism for transmitting the light across a wall of the cooler, or some combination. Thus, in some embodiments the cooler 180 is a cryocooler that includes a first optical window configured to allow optical electromagnetic radiation to pass into the cryocooler. In some embodiments, the system 100 includes a low vibration stage 184 to dampen vibrations from one or more other components of the system, including vibrations from a compressor of the cooler 180.

When multiple beams interact in the material at different angles, spatial-spectral structures are formed in the material. When all beams impinge in the same direction only spectral content is recorded. For example, in some embodiments the two-atomic-state material is an SSH material that stores a complex spatial-spectral grating as absorption variations within a doped, low temperature crystal. In some embodiments, the one or more optical fields 115 produce target optical spectra as spectral or spatial-spectral gratings. In some embodiments, one or more chirped laser fields 125, are recorded as spectral or spatial-spectral gratings in SSH material. At a later time, another optical beam is directed with relatively lower intensity to the SSH material to produce one or more response fields 127a, 127b (collectively referenced hereinafter as response fields 127). The chirped laser field 125 and the optical field 115 may impinge on the material at the same location and angle or at different locations and angles, in various embodiments.

In some embodiments, for laser stabilization, field 113a is also passed by coupler 120a into the SSH material and a feedback field 129a is emitted by the SSH material. The feedback field 129a is passed by EM coupler 120b as field 129b to laser stabilization block 114. Based on the properties of feedback field 129b, the laser stabilization block 114 controls laser 112.

For heterodyne readout processes, a reference optical field (e.g., field 127b) is also produced in addition to a primary response field (e.g., 127a). Any method of generating a reference field may be used. In the illustrated embodiment, the reference optical field 127b emerges from the optical material, usually in a spatial mode that has not recorded the target optical spectrum from optical field 115, such as experienced by chirped laser field 125. In some embodiments, the reference signal 127b is a chirped laser field (not shown) that has not passed through the SSH material. In some embodiments, the reference signal 127b is the transmitted probe signal that is naturally in the same direction as the response signal 127a that itself is often delayed. Thus, in such embodiments, the signal detected at the optical detectors 160 is naturally heterodyne. In some embodiments, the reference signal 127b is a response signal from the chirped optical field interacting with one or more spatial-spectral gratings recorded in the SSH material for the purpose of generating a reference field. In some embodiments in which the detector is outside the cooler 180, the cooler includes an exit optical window among windows 182 that allow the emitted optical signals 127 to pass out of the cooler 180.

The EM detectors 160 include one or more detectors such as optical detectors that detect the time-varying optical intensity in a certain optical bandwidth. In some embodiments, a one- or two-dimensional array of optical detectors is used to simultaneously detect a response field 127 on multiple spatial modes. Scanned or instant images can be generated by the array of detectors. In some embodiments, the EM detector 160 detects only the response field 127a. In some embodiments, the EM detector 160 detects the heterodyne combination of the response field 127a and reference field 127b. For example, the heterodyne combination generates beat frequency variations that are much lower in frequency and larger in amplitude than response signal 127 intensity variations; therefore the beat frequency variations are more accurately measured with current detectors.

The post-detection electronics in EM analyzer 170 use electrical signals output by detectors 160. In the some embodiments, EM analyzer 170 includes a scope, digitizer and processor. In various embodiments, EM analyzer 170 includes different hardware and software components.

The controller 102 uses electronic signals to control EM modulators and EM source 110. In some embodiments the controller uses electronic signals from EM analyzer 170 to determine how to control EM source 110 and EM modulators 130. In various embodiments, controller 102 includes different hardware and software components that perform the methods described in the next section. In various embodiments, the controller 102 is a computer system as described in more detail below with reference to FIG. 5 or a chip set described in more detail below with reference to FIG. 6

In various embodiments, spectral content is imposed in the SSH material or read or both based on the interaction of one or more optical fields 115 or 125 or both. The spectral content is then erased or inverted or both based on one or more subsequent chirped electromagnetic fields 125 designed for reconfiguration of atomic state populations in the SSH material.

Although processes, equipment, and data structures are depicted in FIG. 1 as integral blocks in a particular arrangement for purposes of illustration, in other embodiments one or more processes or data structures, or portions thereof, are arranged in a different manner, on the same or different hosts, in one or more databases, or are omitted, or one or more different processes or data structures are included on the same or different hosts.

Using a system such as system 100, some SSH materials have been used as versatile optical coherent transient (OCT) processing devices. An OCT device relies on a broadband spatial-spectral grating in the optical range that extends over several homogeneous lines, and part or all of the available inhomogeneous broadening absorption profile. All the features of an optical spatial-spectral grating are typically formed substantively simultaneously by recording the spatial-spectral interference of two or more optical pulses separated in time only (purely spectral grating) or separated in both space and time (a spatial-spectral grating). A spatial-spectral grating has the ability to generate a broadband optical output signal that depends on an optical input probe waveform impinging on that grating and the programming waveforms that formed the grating.

In optical analog signal processing, the medium is used to store particular spectral features of interest, such as the result of the interaction of one or more optical waveforms (e.g., optical beams carrying information). See for example, references listed in references section at the end of this description.

In some circumstances, including those described by Merkel, the medium is an optically absorptive medium when most of the population is in the ground state of the two electron quantum level states. This reduces the signal level of a readout beam transmitted through the medium. However, when the population is evenly divided between the two states, and all coherent superposition states have decayed away, the medium is transparent, e.g., signal levels transmitted are essentially equal to the signal levels impinging. Furthermore, when most of the population is in the excited state, the medium is amplifying, e.g., signal levels transmitted are greater than the signal levels impinging.

In Merkel, chirped readout is described. In this case, it is typical to define a desired set of specifications to be achieved simultaneously. There are tradeoffs between the desired specifications. The four parameters specifications of interest are: 1] the instantaneous bandwidth (IBW); 2] the time (T) it takes to get that information out, where the update rate is (1/T) assuming that in a time T any given frequency across the IBW is revisited and updated; 3] the bandwidth of the photo-detection (PBW); and, 4] the resolution bandwidth (RBW) of the device across the IBW. The number of frequency channels (N) being measured by the device is N=IBW/RBW. For chirped readout, the IBW is also the bandwidth that must be chirped over, so that the chirp rate ($\kappa$) can be defined as $\kappa$=IBW/T. Chirp rates have units of $Hz^2$ (or alternatively Hz/s), and chirp rates over many orders of magnitude can be considered depending on the application and desired update rate (UR). For example, a typical chirp rate of $4\times10^{13}$ $Hz^2$ allows one to readout 20 GHz in 0.5 ms with an update rate of 2 kHz. The bandwidth of the photodetector (PBW) is typically desired to be much lower than IBW, and is used to measure the optical intensity oscillations that arise from chirped readout. For a fixed $\kappa$, the choice of PBW will then dictate the RBW of the signals of interest measured by the device. The relationships that show these tradeoffs are RBW=$\kappa$/PBW=IBW/(T*PBW)=(IBW*UR)/PBW. It is typical to choose a lower bandwidth photodetector with a bandwidth of about 50-200 MHz or lower so as to utilize the relatively high signal to noise ratio performance of these devices, and to have the bandwidth of the photodetector well matched with the performance of analog to digital converters at 100-500 megasamples per second (Ms/s, where 1 megsample (Ms)=$10^6$ samples). Using an example of PBW=100 MHz, and $\kappa$=$4\times10^{13}$ $Hz^2$, then RBW=0.4 MHz. In this case, N=20,000 MHz/0.4 MHz=50,000. So the tradeoff across a wide desired IBW with a high performance as set by PBW is really between update rate (UR) and resolution bandwidth (RBW).

In some cases, the SSH material can support wide bandwidth operation and simultaneously have an inherent material resolution bandwidth ($RBW_I$), where $RBW_I$<RBW. The well known SSH material Tm:YAG can exhibit $RBW_I$=0.01 MHz in some conditions, so for IBW=20 GHz then the number of inherent channels ($N_I$) of the material is $N_I$=IBW/$RBW_I$=20,000 MHz/0.01 MHz=2,000,000. The relationship between the material capability $N_I$ and the actual achieved N is X=$N^*$/N=2,000,000/50,000=40.

Another way to view the relationships between the factors 1] to 4] above is to define a ratio R=IBW/PBW. For IBW=20 GHz and PBW=100 MHz, then R=200. This same ratio R will be the relationship between the RBW and UR, as R=RBW/UR. So, if UR=2 kHz, then the RBW=200×2 kHz=0.4 MHz.

Alternatively, a plurality of M readout waveforms interrogating different bandwidths in parallel spatial channels could achieve N times reduction of RBW for a fixed UR, or visa versa.

Cooling and Cryocoolers.

In practice, cooling the SSH crystal to temperatures of 3.0 K-4.5K (nominally referred to as 4K) has been readily achievable with the advent of cryogen-free refrigerators (closed cycle systems with no liquid helium) that are commercially available from several vendors including those listed above. Cryocoolers in general are comprised of two main components, the coldhead and the compressor. Compressors are kept remote from the coldhead with flexlines that provide a flow of helium gas to the coldhead. Typical lengths of the flexlines are 3 meters, and longer lines can be used. These are turnkey systems that run on wall power and have long operation periods before maintenance. The term "closed-cycle" indicates that the system is actually circulating helium gas, and thus does not use liquid helium or liquid nitrogen as a part of the system. In fact, these cryo-refrigerator systems are much like a regular kitchen refrigerator; each plugs into a wall electrical socket and, using a compressor, circulates a coolant (helium gas). Each utilizes a thermal cycle at the coldhead to cool a small metallic coldfinger.

The SSH crystals can be used in any apparatus that cools them to the appropriate temperatures. Liquid helium cryocoolers are in the category of something that is possible to use, but is not generally considered practical for applications where long duration of operation is desired without maintenance. For example, in a liquid helium system, liquid helium is added continuously at an disadvantageous cost and effort. Closed cycle systems, by comparison, do not have this requirement. Rather, they consume wall power and run continuously, and are typically maintained only on the order of every 10,000 hours.

For some optical processing applications about 100 milliwatts (mW, 1 mW=$10^{-3}$ Watts) of cooling power are consumed per channel for a single channel device. However, in parallel channel operation, the SSH-based processor has a significant advantage. Since one crystal can effectively handle dozens of parallel channels, SSH-based processing scales to lower cooling requirements per channel for parallel systems. For example, a small sample of crystalline material and its mounting hardware is cooled to 4 K. Analog RF signals come into the 4 K stage as modulated optical laser beams through windows or on fiber optical cables, so no cooling of RF cables is required. Likewise, the readout process uses laser beams and thus the output is all-optical. The main cooling function is to remove parasitic heating of the crystal.

Vibration Dampening

For some systems 100, a dampening of the vibrations in the coldhead to the crystal is advantageous. This is achieved with a low vibration stage 184 added to the coldfinger, with demonstrated dampening of the inherent vibration of the cold sample from ~5 μm (1 μm, also called a micron,=$10^{-6}$ meters) to less than 10 nanometers (nm, 1 nm=$10^{-9}$ meters), with a small loss of base temperature. The cooler readily achieves 3.3 K operation with this stage (see, for example, United States Published Patent Application 2010005066 listed in the references.

The mounting hardware of the doped crystal in the cryocooler that is used has been the subject of a related United States Published Patent Application 20100127148, listed in the references.

Material Considerations

Spatial Spectral Holographic (SSH) materials (also called Spatial Spectral, S2, materials herein) provide the core element that enables signal processing applications, such as spectrum analysis, direction finding, correlative signal processing, data storage, or signal delay. There are several properties, listed next, that indicate a material is useful for such processing applications.

Material properties of interest include the following. (1) Composition indicates the chemical elements combined in the material, which can be manufactured or grown with elements that are available, in a rugged durable form factor, typically a rare earth element doped into a crystalline lattice.

(2) High spatial quality indicates the uniformity of the material composition over the size of the crystal and depends on the host and dopant, and growth technique. High spatial quality is desired so that laser light can effectively irradiate the atoms, and not scatter, and also so that output light be captured after irradiating the atoms.

(3) Absorption coefficient α determines the rate at which photons carrying information are absorbed per unit length of the material, given in units of $cm^{-1}$. Absorption coefficient sets physical limit on the length L of the samples that is involved to get the product (αL) and is in a range from about 1 to about 3 for useful applications.

(4) Instantaneous Bandwidth (IBW) of the atomic resonance is the bandwidth over which absorption occurs and is desired to be >>1 GHz. Practical materials to date, excluding current work, show bandwidths of just over 20 GHz over a 3 dB (deciBel) full width (a ratio X of absorption over maximum absorption is expressed as $10 \log_{10}\{X\}$ deciBels, dB). A width of 3 dB indicates the optical frequency band over which the absorption is within 3 dB of the maximum absorption. Materials with bandwidth >20 GHz over a 3 dB width are desired, but were not available with a good combination of qualities before the work presented here.

(5) Wavelength of the atomic resonance is the wavelength at which maximum absorption occurs and is expressed in nanometers (nm, 1 nm=$10^{-9}$ meters). The wavelength of atomic resonance is practical when in the range of available lasers that can be used to irradiate the atomic transition and thus be effectively absorbed by the material.

(6) Temperature of operation is desired to be greater than about 3K for various applications, but such temperatures are not readily found because cooling suppresses the phonon-electron interactions in the material and warmer temperatures disadvantageously increase phonon-electron interactions. Temperatures of operation are practical in the 3K range when using cryo-refrigerators (also called cryocoolers herein) that do not require a continuous supply of liquid Helium. Such temperatures are readily achieved with current commercial cryocoolers, such as Gifford McMahon cryocoolers (from vendors such as Sumitomo (SHI) Cryogenics of America, Inc., in Allentown, Pa. and Janis Research Company of Wilmington, Mass.) and Pulse Tube cryocoolers (from vendors such as Cryomech, Inc of Syracuse, N.Y.). Temperatures of operation in a range less than 3 K, which is outside of the operating range of these coolers and usually involve liquid Helium or other approaches to cooling, are much less practical.

(7) Lifetime of the atomic transition is the time that the stored target analog spectrum representing the signals of interest will persist and is related to the average time the electrons of the dopant remain in an excited state before returning to the ground state. The lifetime is desired to be long enough to sufficiently interrogate the target analog spectrum (e.g., about one millisecond) in some applications without significant loss during the interrogation time.

(8) Resolution bandwidth (RBW) is the frequency difference between detectably distinct absorption features. It is desired to be as narrow as possible within the constraints imposed by application-specific requirements and the material host and dopant, dopant concentration, growth technique, temperature, optical excitation power, optical excitation bandwidth, noise from mechanical vibrations, external magnetic field and its strength and orientation, among others. RBW is typically considered very advantageous when less than 0.01 MHz at temperatures below about 4 K. RBW is typically still advantageous when less than 1 MHz for applications at about 4K.

The absorption features of ions or molecules that are doped into inorganic or organic materials are spectrally broadened by two main classes of mechanisms. Homogeneous broadening is the fundamental broadening experienced by all ions or molecules independently, and arises from a well known quantum-mechanical relationship between a transition frequency line shape and a dephasing time of an excited electron in the ion or molecule. Inhomogeneous broadening refers to a quasi-continuum of overlapping individual spectra of all of the ions or molecules in the material, which have microscopically different environments and therefore slightly different transition frequencies. When the inhomogeneous broadening of a material is significantly larger than the homogeneous broadening of a material, the material displays useful optical absorption properties and is called an inhomogeneously broadened transition (IBT) material. As described above, such a material can be used to form spatial-spectral gratings and is therefore also called a spatial-spectral (S2) material. The spatial-spectral gratings can be used to store holographic data in which the output varies with the spatial mode of observations and so the material is also called a spatial-spectral holographic (SSH) material. The latter term is used predominantly herein.

Doping of certain rare earth ions in inorganic materials in a certain way produces SSH materials that are useful in broadband signal processing applications. In various materials known in the art, outside the current work, the absorption demonstrates optical frequency selectivity over bandwidths typically far greater than 1 GHz, and with frequency resolution typically orders of magnitude less than 1 MHz. The frequency resolution of an SSH material is typically referred to as the homogeneous linewidth of the material. The practical limit on the maximum duration of the analog signal that can be recorded in an SSH materials is roughly the reciprocal of the material's homogeneous linewidth. For example, a material with a homogeneous linewidth of 1 MHz can record signals with duration up to roughly one microsecond. The maximum bandwidth that can be recorded by an SSH materials is roughly equal to the inhomogeneous bandwidth of the SSH material. For example, an SSH material with inhomogeneous linewidth of 100 GHz can record signals with bandwidths up to 100 GHz.

The materials known to date, outside the current work, are typically a rare earth element doped into a host material, where the host material is typically a crystalline structure. Other hosts such as various glasses, etc are possible. Thus, the desirable SSH material should exhibit a combination of properties that make its uses practical. These include high spatial quality, wavelength of operation, bandwidth of operation, temperature of operation, resolution bandwidth of operation, and lifetime of the information storage. The materials known presently, outside the current work, that exhibit a proper combination of these properties for practical operation are limited. While many materials have been studied as cited in the references listed below, the materials that have been used to date, outside the current work, for applications have been rather limited.

The frequency selectivity can be modified locally by interaction with optical signals that excite electrons in the ions, which serve as absorbers, from a ground state to an excited state, thereby removing those electrons from the population of ground state absorbers at that location in the material. This creates a reduction in the absorption at the resonant frequency of these ions. Therefore, some such materials have been used to form highly frequency-selective spatial-spectral gratings. After typically an electronic population lifetime, the electrons may return to the ground state and the grating decays with a characteristic time called the population decay time. When electrons are removed from the ground state in a particular homogeneously broadened absorption peak, a "hole" is said to be "burned" in the absorption of the material at the frequency of the hole, and light at the frequency of the hole is transmitted with substantially less absorption. A spectral hole is an example of the simplest spectral feature that can be recorded, and combinations of spectral holes at different frequencies with varying depths are here denoted as spectral features or spectral gratings. The lifetime of the spectral features is determined by the time it takes for the absorbers in the system to return to their equilibrium state. Spectral features may be made permanent in some systems.

Figure 2:
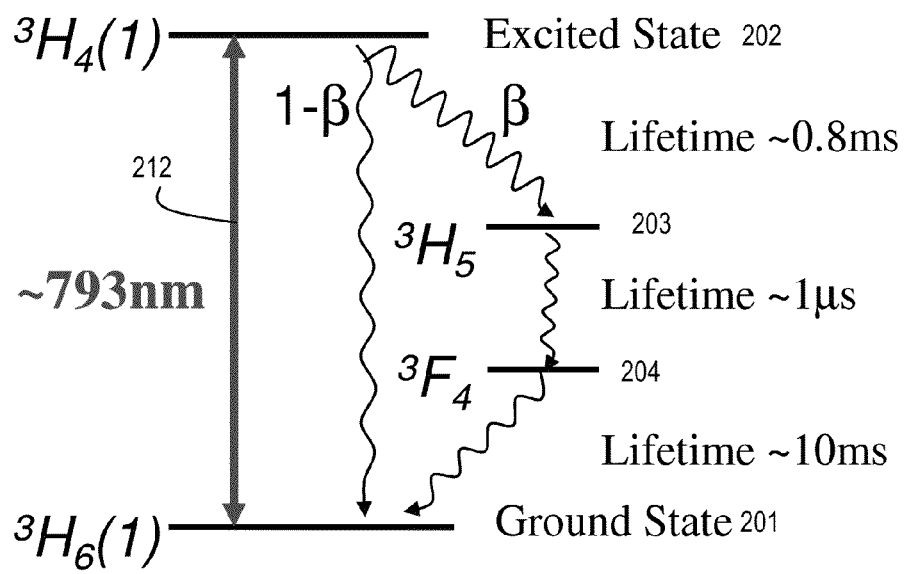
FIG. 2 is a block diagram that illustrates example optical photon absorption by Thulium, according to an embodiment.

The energy level diagram for Thulium, number 69 on periodic table, is shown in FIG. 2. FIG. 2 is a block diagram that illustrates example optical photon absorption by Thulium, according to an embodiment. Thulium has a nominal 793 nm transition between a ground state 201 ($^3H_6$) and an excited state 202 ($^3H_4$), which varies with material host. This means that a photon with approximately 793 nm wavelength is absorbed by an electron in the ground state 201 energy level and is accelerated to the stable excited state 202 where it resides on average for a lifetime of about 0.8 milliseconds (ms). Depending on the host material, the electron returns directly to the ground state 202 by emitting a photon of the same wavelength or returns indirectly passing through two intermediate states, a short lifetime (about 1 microsecond, μs) intermediate state 203 ($^3H_5$) and a long lived (10 millisecond, ms) state ($^3F_4$) called the bottleneck state 204. The branching ratio β indicates the percentage of the excited atoms that decay to the useful bottleneck state 204. When an atom of Thulium is in the bottleneck state 204, photons of wavelength 793 nm are not effectively absorbed.

The use of the rare earth element Thulium as a dopant has created useful materials. One of these, $Tm^{3+}:Y_3Al_5O_{12}$ or Tm:YAG, is a well known and studied material, with concentrations of 0.1 at. % or 0.05 at. % or lower. This material has been a preferred SSH crystal material to date, outside the current work, for its combined collective properties that make it practical and useful.

Tm:YAG crystals are typically grown using the well known Czochralski method. High optical quality ultra-high purity crystals with very low loss from scattering have been grown. Such crystals can be characterized as to their optical purity by measuring the optical signal losses for a light beam that is not resonant with any absorption feature. An ultra-high purity crystal can exhibit losses as low as 10 parts per million per centimeter of material length (ppm/cm), or 0.001%/cm loss. Low scattering loss material is important in many optical processing applications as it impacts both the ability to irradiation the Thulium ions as well as the ability to detect the output light. In addition, these crystals can be produced with impurity and defect levels at the level of 1 part per million (ppm) or lower. Tm:YAG components utilized in SSH-based signal processing applications to date, outside the current work, have typically had scattering losses of less than 1000 ppm/cm (0.1%/cm) and impurity levels in the range of 1-10 ppm, but some SSH-based signal processing applications could benefit from these higher quality materials.

As light travels through crystalline materials, the spatial uniformity of an optical beam can also be distorted. As such, the overall spatial uniformity of the material can impact device performance in SSH-based applications. The uniformity of a given crystalline sample is impacted by a number of factors including the growth conditions and region of the crystal used. The change in the uniformity of an optical beam through a material is measured using an interferometer and is typically expressed as a transmitted wavefront distortion in waves at the wavelength (λ) 632.8 nm. Typical Tm:YAG components for SSH-based applications have had a spatial uniformity of better than λ/10 although higher uniformity can be achieved if enough effort is expended.

The use of a particular SSH material Tm:YAG has been in the public domain for nearly two decades. The useful properties of Tm:YAG are summarized here. The composition is Thulium doped YAG, $Tm^{3+}:Y_3Al_5O_{12}$ also expressed as $Tm^{3+}:YAG$ or Tm:YAG. Thulium is the dopant with atomic transition $^3H_6$-$^3H_4$ of interest. Thulium doping levels are about 0.05 at. % to about 0.1 at. %. Host is YAG, Yttrium Aluminum Garnet, $Y_3Al_5O_{12}$. Spatial quality is high when grown using the Czochralski method and with low levels of impurities in the 1 ppm level or lower. Low scattering loss as low as 10-100 ppm/cm has been achieved with high spatial uniformity of λ/10 or better for 632.8 nm light. Absorption coefficient α of about 1.0 $cm^{-1}$ for 0.05 at. % doping leads to physical lengths of samples of about 1 cm to about 10 cm being practical where the light beam is relatively uniform through the sample and for which the sample can be practically mounted in a cryocooler. IBW of about 17 GHz at 3 dB width have been achieved. Wavelength of the atomic resonance is 793.38 nm, well within range of available lasers. Temperature of operation is about 4K for the properties listed here. Lifetime of the atomic transition is about 0.8 ms in upper state and about 10 ms at the bottleneck state when no external magnetic field is applied. RBW is typically about 0.018 MHz at 3.5 K at short times (0.01 ms) and about 0.028 MHz at 3.5 K at long times (1 ms). RBW is typically about 0.4 MHz with excitation broadening, which assumes 50% excitation of all atoms across about 20 GHz bandwidth. Some of these properties are summarized in the table of FIG. 4, described below.

Some of the materials knowledge to date, outside the current work, is in the public domain, and is presented here as background information. This presentation serves to identify what is the new and non-obvious contributions of the current work. The materials are identified as Tm:YAG (dopant densities of 0.05 at. % or 0.1 at. %), Tm:YLuAG (dopant density of 3 at. %, with 50% of the Y in YAG replaced by Lu), and Thulium doped in a crystal of Lithium Niobate (Tm:LiNbO$_3$, shortened to Tm:LN)) References [1,2,3] cover these materials, as well as some unpublished material measurements [4] that were derived from fundamental research efforts.

To put some embodiments in more context, comparisons can be made to Tm:LN (doping density of Thulium of about 0.1 at. %), which show several interesting material properties, but at this point in time the material is not as promising for the SSH optical processing application space, and has been studied previously in detail, and these results are publically known and published [3]. The absorption coefficient is >14/cm and the 3 dB bandwidth of >300 GHz, with an absorption line that shows a very disordered host. However, these two attributes by themselves are not sufficient for use as a practical SSH material. The unattractive attributes measured are the following. The lifetime of the excited state is short ~150 microseconds, due to the higher oscillator strength. The material's inherent linewidth at 3.5 K is ~200 kHz. The resolution bandwidth broadening with excitation, or instantaneous spectral diffusion (ISD), has been partially measured, and those results show it is disadvantageously high, although not fully quantified.

Example Material Embodiments

A new SSH material has been characterized with useful properties for optical processing. This new material is Thulium doped into a host Yttrium Lutetium Aluminum Garnet (Tm:YLuAG), in which Lutetium occurs in the crystal on the same order of magnitude as Yttrium (e.g., about 10% to 90% of the binding positions on the crystal, of which 3 binding positions occur on each Al$_5$O$_{12}$ node of the crystal). The work performed has characterized this material at temperatures between about 3 K, and produced breakthrough results for new functionality that shows a surprisingly impressive >270 GHz 3 dB bandwidth with other useful properties. Specifically, this material exhibits high spatial quality, a wavelength of about 793.8 nm, a temperature of operation of 3K, and a good spectral resolution of <1 MHz under most conditions.

The composition of one embodiment is Thulium doped Yttrium Lutetium Aluminum Garnet, Tm:YLuAG, or more generally, Tm$^{3+}$:Y$_{3-x}$Lu$_x$Al$_5$O$_{12}$ (x>0, x typically ~1.5 or in a nominal range of about 0.1≤x≤about 2.9).

Thulium is the dopant with atomic transition $^3$H$_6$-$^3$H$_4$ of interest. Based on the new measurements presented here, it is anticipated that Tm doping levels of 0.1-3.0 atomic percent (at. %) are useful and practical for optical processing; where dopant levels less than about 3.0 at. % are expected to have better resolution linewidth and instantaneous spectral diffusions properties than that tested. Furthermore, lower dopant levels are anticipated to give better linewidth and coherence properties.

Other Lutetium concentrations (x) of Tm$^{3+}$:Y$_{3-x}$Lu$_x$Al$_5$O$_{12}$ are possible and useful, with less bandwidth and other properties expected to be similar to Y$_3$Al$_5$O$_{12}$.

Experimental Embodiment

As tested to date, material host was Y$_{1.5}$Lu$_{1.5}$Al$_5$O$_{12}$, indicating 50% Yttrium and 50% Lutetium, doping at 3.0 at. % in x=1.5 host material. This material was grown utilizing the Czochralski method with low levels of impurities similar to Tm:YAG. This material shows high optical spatial quality, with low scattering loss and high spatial uniformity similar to Tm:YAG. This material showed absorption coefficient (cc) of about 3.8/cm for the 3.0 at. % dopant level. Measured population decay due to the relaxation of the upper $^3$H$_4$ state 202 to the bottleneck state 204 shows a very high branching ratio approaching 100% (or β~1.0) with a model for a distribution of Thulium ions with excited state lifetimes ranging between 20 to 530 microseconds (μs). A long lifetime of about 17 ms was measured for the bottleneck state with no external magnetic field applied. Resolution bandwidth (RBW) for the 3.0 at. % dopant level was measured typically about 0.025 MHz at 3.5 K at wait times of 0.01 ms and typically about 0.052 MHz at longer wait times of 1 ms. These measurements imply that RBW is expected to be typically <1.0 MHz with excitation broadening, which assumes 50% excitation of all atoms across an approximately 20 GHz bandwidth.

FIG. 4 is a table that illustrates example measurements of material properties of example materials, according to an embodiment. FIG. 4 presents a table that summarizes the attributes of the Tm:YLuAG material as demonstrated, as well as those for materials Tm:YAG and Tm:LiNbO$_3$, based on the prior knowledge of these. Summary of previously known and new materials results. Previously known results are indicated with a reference [ ], while new results resulting from measurements performed by this work show a reference to NEW. T=Temperature in Kelvin; Tw=waiting time between pulses 2 and 3 in a three pulse echo measurement in milliseconds; 8% Ex.=excitation quoted as 8% effective depth across a bandwidth in Gigahertz; 2PE=Two pulse photon echo measurement; 3PE=three pulse photon echo measurement; RBW=resolution bandwidth (or linewidth); RBW-B=resolution bandwidth broadening with excitation between pulses 2 and 3 in a 3PE experiment.

Figure 3:
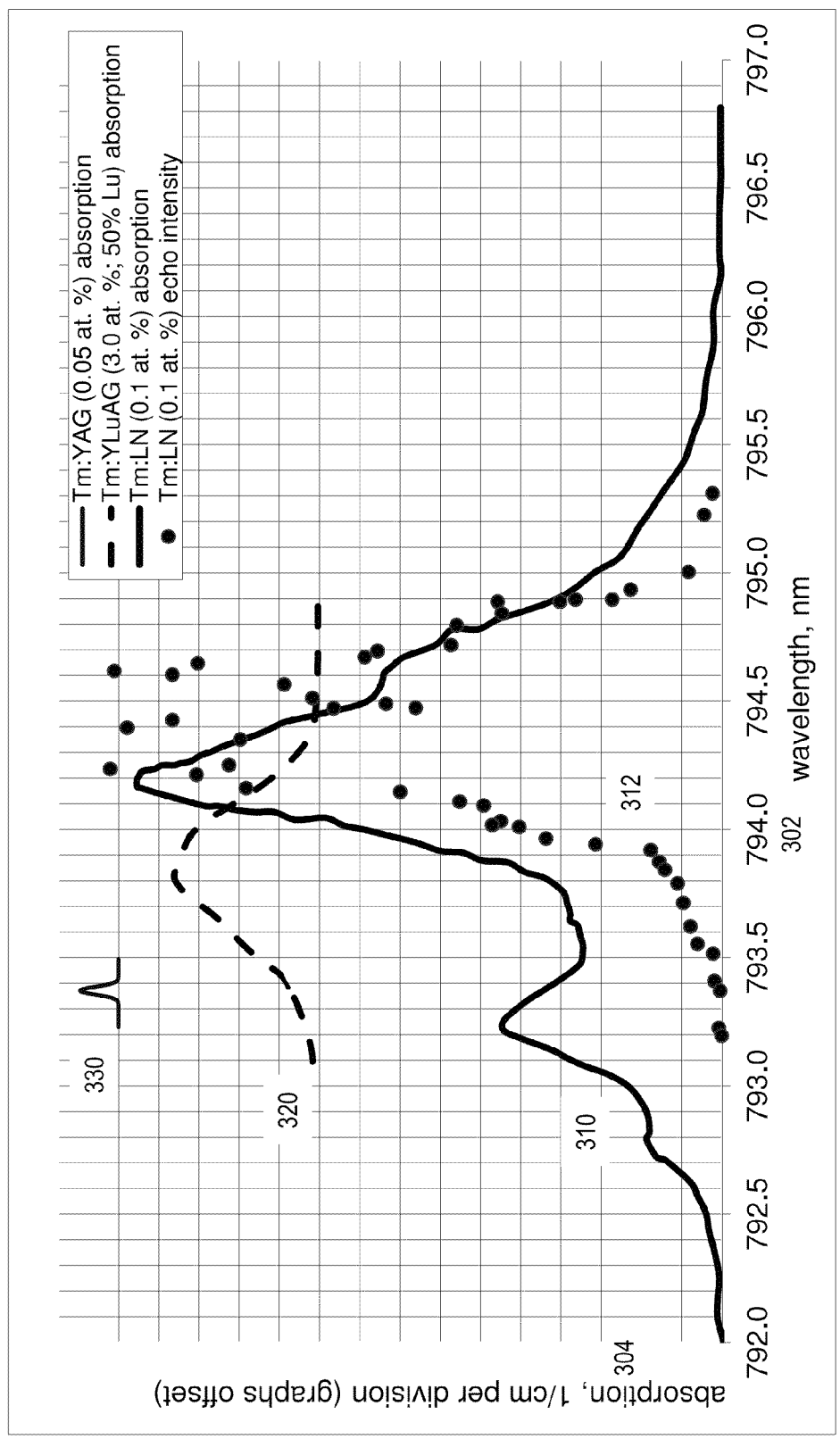
FIG. 3 is a graph that illustrates absorption properties of example materials as a function of optical wavelength, according to an embodiment.

Some of the physical and spectroscopic properties of these materials are described graphically in FIG. 3. FIG. 3 is a graph that illustrates absorption properties of example materials as a function of optical wavelength, according to an embodiment. The horizontal axis 302 is optical wavelength in nanometers. The vertical axis 304 is relative absorption coefficient in inverse centimeters. Trace 310 depicts absorption coefficient for Tm:LN and points 312 depicts the reduction of the echo intensity. Trace 320 depicts absorption coefficient for Tm:YLuAG (Tm dopant concentration of 3 at %), offset vertically to avoid obscuring the results. Trace 330 depicts absorption coefficient for Tm:YAG (Tm dopant concentration of 0.05 at %), offset vertically again to avoid obscuring the results. Tm:YLuAG shows surprisingly much broader IBW than Tm:YAG with a peak absorption moved toward longer wavelengths near 794 nm.

In this figure, the resonance frequency, bandwidth, absorption coefficient and lineshape of the $^3$H$_6$ to $^3$H$_4$ transition of Thulium are described.

The 3.0 at. % Tm doping material of Tm:YLuAG was characterized, and is being used to estimate performance for lower doping densities. For this material, there are 60× more Tm atoms in the YLuAG host as compared to 0.05 at. % Tm in YAG, and there is ~15 times more bandwidth. On a per bandwidth basis, there are ~4 times more atoms in the Tm:YLuAG material. This new study thus indicates that Tm:YLuAG is a desired new material with useful and non-obvious properties, especially for Thulium dopant concentrations less than 3.0 at. %.

Another surprising result is that the branching ratio approaches almost 100% with a distribution of upper state lifetimes. The bottleneck shows a somewhat surprising two-fold increase for Tm:YLuAG as compared to Tm:YAG (~17 ms versus ~10 ms). The material resolution bandwidth (RBW) measurements showed good overall performance and trends, with the inherent 2 pulse photon echo measurements giving a RBW of roughly fourfold wider for the 3.0 at. % Tm:YLuAG as compared to 0.05 at. % Tm:YAG. This RBW measurement is anticipated to be lower at lower Tm per bandwidth concentration. The RBW was quite uniform across the absorption bandwidth. The broadening of the RBW with external excitation shows good overall trending, with the effect of instantaneous spectral diffusion (ISD) effect being higher for 3.0 at. % Tm:YLuAG (×4 in RBW with full excitation of the measurements), but still surprisingly <1 MHz, and definitely not extremely higher (e.g. >>1 MHz) as has been observed in some materials with wideband absorption. Much higher effects of ISD were expected in the 3.0 at. % Tm:YLuAG material by the inventors with the inherent ×60 more Tm atoms in the host.

Other Embodiments

It is anticipated that further advantages may be achieved at lower concentration of Thulium than the 3.0 at. % in YLuAG, with the tradeoffs of physical length of the material to get a product of aL that can be reasonably mounted in a cryocooler and interact with a laser beam. At the present time, a physical length constraint of about 3.0 cm is imposed by use in practical cryocoolers. Much longer samples can be employed in other embodiments. For this case, a Tm:YLuAG material with a Thulium dopant level of 0.5 at. % (6 times less Tm into the same YLuAG host) is anticipated to yield material characterization with a lower RBW, and a lower RBW broadening and could use a 3.0 cm sample length. For both lower RBW and lower RBW broadening, the use of lower concentrations of Thulium in some embodiments is advantageous because the lower concentrations are anticipated to approach or perhaps improve upon the RBW and RBW broadening for Tm:YAG, and would provide performance like or better than Tm:YAG over a wider bandwidth.

Thus, the usefulness of Tm:YLuAG above about 3 K has been established, with results that show good properties over a bandwidth that is surprisingly much wider than that of Tm:YAG, that are not previously known or published. The properties of a lower dopant level Tm:YLuAG material in some embodiments are anticipated to be even better than those measured in the experimental embodiments.

Controller Hardware Overview

Figure 5:
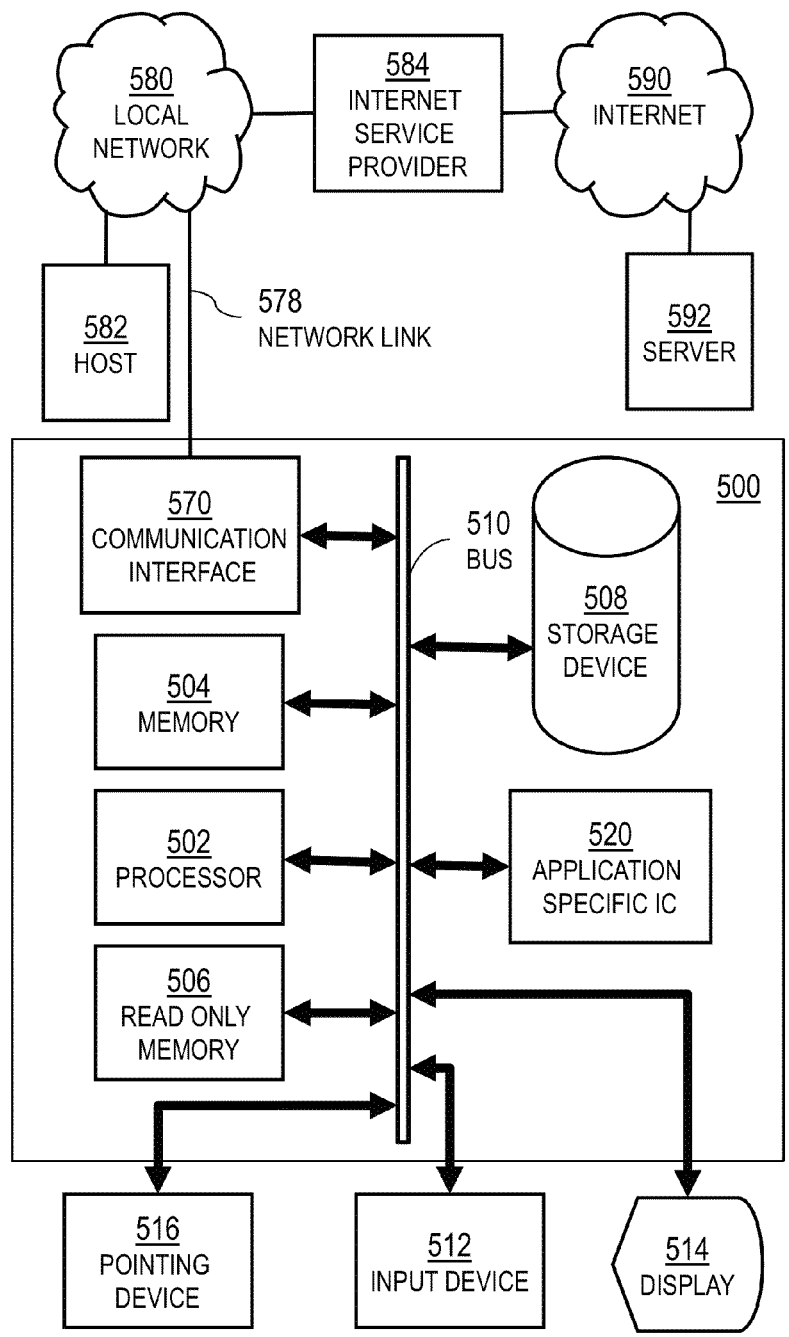
FIG. 5 is a block diagram that illustrates a computer system upon which a controller of the invention may be implemented.

FIG. 5 is a block diagram that illustrates a computer system 500 upon which an embodiment of the invention may be implemented. Computer system 500 includes a communication mechanism such as a bus 510 for passing information between other internal and external components of the computer system 500. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit).). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of one or more methods described herein.

A sequence of binary digits constitutes digital data that is used to represent a number or code for a character. A bus 510 includes many parallel conductors of information so that information is transferred quickly among devices coupled to the bus 510. One or more processors 502 for processing information are coupled with the bus 510. A processor 502 performs a set of operations on information. The set of operations include bringing information in from the bus 510 and placing information on the bus 510. The set of operations also typically include comparing two or more units of information, shifting positions of units of information, and combining two or more units of information, such as by addition or multiplication. A sequence of operations to be executed by the processor 502 constitute computer instructions.

Computer system 500 also includes a memory 504 coupled to bus 510. The memory 504, such as a random access memory (RAM) or other dynamic storage device, stores information including computer instructions. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of computer instructions. The computer system 500 also includes a read only memory (ROM) 506 or other static storage device coupled to the bus 510 for storing static information, including instructions, that is not changed by the computer system 500. Also coupled to bus 510 is a non-volatile (persistent) storage device 508, such as a magnetic disk or optical disk, for storing information, including instructions, that persists even when the computer system 500 is turned off or otherwise loses power.

Information, including instructions, is provided to the bus 510 for use by the processor from an external input device 512, such as a keyboard containing alphanumeric keys operated by a human user, or a sensor. A sensor detects conditions in its vicinity and transforms those detections into signals compatible with the signals used to represent information in computer system 500. Other external devices coupled to bus 510, used primarily for interacting with humans, include a display device 514, such as a cathode ray tube (CRT) or a liquid crystal display (LCD), for presenting images, and a pointing device 516, such as a mouse or a trackball or cursor direction keys, for controlling a position of a small cursor image presented on the display 514 and issuing commands associated with graphical elements presented on the display 514.

In the illustrated embodiment, special purpose hardware, such as an application specific integrated circuit (IC) 520, is coupled to bus 510. The special purpose hardware is configured to perform operations not performed by processor 502 quickly enough for special purposes. Examples of application specific ICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 570 sends and receives electrical, acoustic or electromagnetic signals, including infrared and optical signals, that carry information streams, such as digital data.

The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 502, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 502, except for carrier waves and other signals.

Logic encoded in one or more tangible media includes one or both of processor instructions on a computer-readable storage media and special purpose hardware, such as ASIC *620.

Network link 578 typically provides information communication through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590. A computer called a server 592 connected to the Internet provides a service in response to information received over the Internet. For example, server 592 provides information representing video data for presentation at display 514.

The invention is related to the use of computer system 500 for implementing the techniques described herein. According to one embodiment of the invention, those techniques are performed by computer system 500 in response to processor 502 executing one or more sequences of one or more instructions contained in memory 504. Such instructions, also called software and program code, may be read into memory 504 from another computer-readable medium such as storage device 508. Execution of the sequences of instructions contained in memory 504 causes processor 502 to perform the method steps described herein. In alternative embodiments, hardware, such as application specific integrated circuit 520, may be used in place of or in combination with software to implement the invention. Thus, embodiments of the invention are not limited to any specific combination of hardware and software.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server 592 transmits program code for a particular application, requested by a message sent from computer 500, through Internet 590, ISP equipment 584, local network 580 and communications interface 570. The received code may be executed by processor 502 as it is received, or may be stored in storage device 508 or other non-volatile storage for later execution, or both. In this manner, computer system 500 may obtain application program code in the form of a signal on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red a carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

Figure 6:
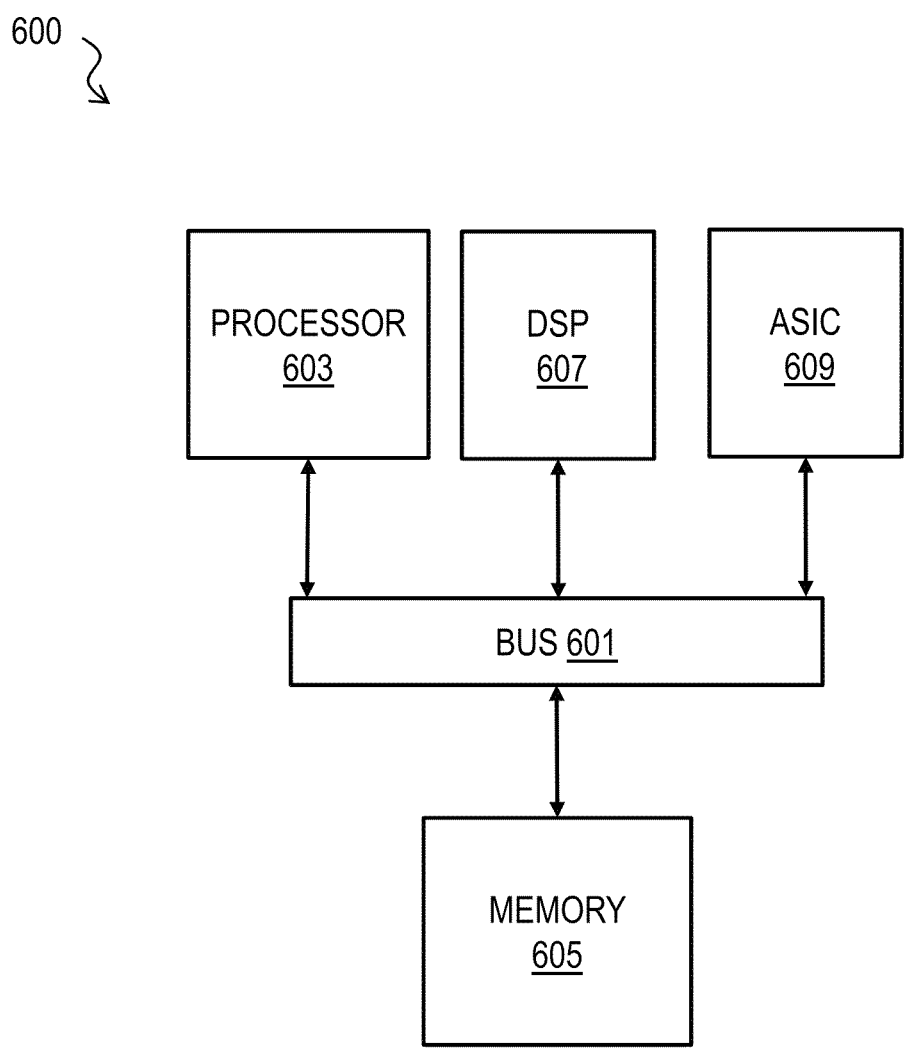
FIG. 6 illustrates a chip set upon which a controller of the invention may be implemented.

FIG. 6 illustrates a chip set 600 upon which an embodiment of the invention may be implemented. Chip set 600 is programmed to perform one or more steps of a method described herein and includes, for instance, the processor and memory components described with respect to FIG. *6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/ or limitation of electrical interaction. It is contemplated that in certain embodiments the chip set can be implemented in a single chip. Chip set 600, or a portion thereof, constitutes a means for performing one or more steps of a method described herein.

In one embodiment, the chip set 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips. The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 605 also stores the data associated with or generated by the execution of one or more steps of the methods described herein.

Alternations and Extensions

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items. elements or steps. Furthermore, the indefinite article "a" or "an" is meant to indicate one or more of the item, element or step modified by the article.

REFERENCES

The entire contents of each of the following cited documents is hereby incorporated by references as if fully set forth herein, except for terminology that is inconsistent with that used herein.

[1] C. W. Thiel, T. Bottger, R. L. Cone, "Rare-earth-doped materials for applications in quantum information storage and signal processing" Journal of Luminescence 131 (2011) 353-361.

[2] Y. C. Sun, "Rare Earth Materials in Optical Storage and Data Processing Applications", Spectroscopic Properties of Rare Earths in Optical Materials, Springer Series in Materials Science, 2005, Volume 83, Chapter 7, 379-429.

[3] C. W. Thiel, Y. Sun, T. Bottger. W. R. Babbitt, R. L. Cone, "Optical decoherence and persistent spectral hole burning in Tm3+:LiNbO3" Journal of Luminescence 130 (2010) 1598-1602; C. W. Thiel, Y. Sun, T. Bottger. W. R. Babbitt, R. L. Cone, "Optical decoherence, Spectral Diffusion, and 169 ™ Hyperfine Structure of Tm3+:LiNbO3 at 794 nm for Quantum Computing and Signal Processing Applications, Optec conference poster, Bozeman, Mont. Aug. 27, 2008.

[4] a) R. L Cone, G. Wang, G. White, C. W. Thiel, L. Seeley, R. Hutcheson, R. W. Equall, R. M. Macfarlane, and M. J. M. Leask, "Material Development and Challenges for PSHB Devices at Infrared, Visible, and Communication Wavelengths" The Big Sky Workshop on the Applications of Persistent Spectral Holeburning, organized by David J. Brady, Alan Craig, and Rufus Cone, Big Sky, Mont., Mar. 3-6, 1996; b) R. L. Cone, "Persistent Spectral Hole Burning Materials for Time-And Frequency-Domain Optical Memories and Signal Processing," Final Technical Report, for 30 Sep. 1994 to 29 Sep. 1997, AFOSR-DEPSCoR Contract Number F49620-94-1-0465; Jun. 27, 1998; c) Y. Sun and R. L. Cone, "Tm:YAG, Tm:LuAG and Tm:Y-LuAG Summary," DARPA report, Oct. 27, 2005.

[5] Y. Sun, C. W. Thiel and R. L. Cone, "Optical decoherence and energy level structure of 0.1% Tm3+:LiNbO3," *Physical Review* B 85, 165106 (2012).

[6] U.S. Pat. No. 4,459,682 entitled "Time domain data storage," Inventor T. W. Mossberg, Issued Jul. 10, 1984.

[7] U.S. Pat. No. 4,670,854 entitled "Optical cross-correlation and convolution apparatus," Inventors T. W. Mossberg, Y. S. Bai, W. R. Babbitt, N. W. Carlson, Issued Jun. 2, 1987 (hereinafter Mossberg, Bai, et al),

[8] U.S. Pat. No. 5,239,548 entitled "Optical signal processor for processing continuous signal data," Inventors W. R. Babbitt and J. A. Bell, Issued Aug. 24, 1993 (hereinafter Babbitt and Bell),

[9] U.S. Pat. No. 6,407,831, Issued Jun. 18, 2002 "Coherent Interaction of Optical Radiation Beams with Optical-Electronic Materials of Generalized Crystal Symmetry"

[10] U.S. Pat. No. 6,680,860 entitled "Optical coherent transient continuously programmed continuous processor," Inventors K. D. Merkel and W. R. Babbitt, Issued Jan. 20, 2004

[11] U.S. Pat. No. 6,516,014 Issued Feb. 4, 2003, "Programmable Frequency Reference for Laser Frequency Stabilization, and Arbitrary Optical Clock Generator, Using Persistent Spectral Hole Burning"

[12] U.S. Pat. No. 6,654,394 Issued Nov. 25, 2003, "Laser Frequency Stabilizer Using Transient Spectral Hole Burning"

[13] U.S. Pat. No. 6,680,860 Issued Jan. 20, 2004 "Optical Coherent Transient (OCT) Continuously Programmed Continuous Processor (CPCP)"

[14] U.S. Pat. No. 7,145,713 Issued Dec. 5, 2006 "Techniques for recovering Optical Spectral Features Using a Chirped Optical Field"

[15] U.S. Pat. No. 7,193,879 Issued Mar. 20, 2007 "Techniques for Multiple Frequency Chirp Readout of Material with Inhomogeneously Broadened Absorption Spectrum"

[16] U.S. Pat. No. 7,265,712 Issued Sep. 4, 2007, "Method and Apparatus for Processing High Time-Bandwidth Signals Using a Material with Inhomogeneously Broadened Absorption Spectrum"

[17] U.S. Pat. No. 7,307,781 Filed Jul. 14, 2006 Issued Dec. 11, 2007 "Techniques for using chirped fields to reconfigure a medium that stores spectral features"
[18] U.S. Pat. No. 7,379,652 Issued May 27, 2008 "Method and Apparatus for Detecting Optical Spectral Properties Using Optical Probe Beams with Multiple Sidebands"
[19] U.S. Pat. No. 7,391,550 Issued Jun. 24, 2008 Method and Apparatus for Optical Broadband Frequency Chirp
[20] U.S. Pat. No. 7,471,224 Issued Dec. 30, 2008 "Broadband Analog to Digital Conversion Using Analog Spectral Recording"
[21] United States Patent Application 2010005066 "Apparatus and methods for improving vibration isolation, thermal dampening, and optical access in cryogenic refrigerators"
[22] United States Patent Application 20100127148 "Vibration Reducing Sample Mount With Thermal Coupling"
[23] Provisional Application for S2 DF with MZI, and, Provisional Application for S2 DF with Dual Port
[24] Provisional Application for hardware for SSB-SC readout of S2 processors
[25] N. Ohlsson, M. Nilsson, S. Kroll, and R. Krishna Mohan, "Long-time-storage mechanism for Tm:YAG in a magnetic field," Opt. Lett. 28, 450-452 (2003) published International Patent application WO 2003/098384 entitled "Techniques for processing high time-bandwidth signals using a material with inhomogeneously broadened absorption spectrum, Inventors: K. D. Merkel, Z. Cole, K. M. Rupavatharam, W. R. Babbitt, T. Chang and K. H. Wagner, 27 Nov. 2003.

What is claimed is:

1. A doped crystal comprising Thulium doped into a host crystal of Yttrium Lutetium Aluminum Garnet wherein a concentration of dopant Thulium atoms is less than 3 atomic percent.

2. A doped crystal as recited in claim 1, wherein:
an average number designated x of Lutetium atoms per molecule of Aluminum Garnet is less than 3;
an average number of Yttrium atoms per molecule of Aluminum Garnet is substantively equal to 3-x; and
x is in a range from about 0.1 to about 2.9.

3. A doped crystal as recited in claim 1, wherein the concentration of dopant Thulium atoms is less than about 0.5 atomic percent.

4. An apparatus comprising:
a source for optical electromagnetic radiation;
a cryocooler configured to maintain an operating temperature in a range from about 3 Kelvin to about 5 Kelvin, wherein the cryocooler includes a first optical window configured to allow optical electromagnetic radiation to pass into the cryocooler;
a doped crystal comprising Thulium doped into a host crystal of Yttrium Lutetium Aluminum Garnet disposed inside the cryocooler in a position to be illuminated by incident optical electromagnetic radiation derived from the source; and
a detector configured to detect optical electromagnetic radiation emitted from the doped crystal.

5. An apparatus as recited in claim 4, wherein a concentration of dopant Thulium atoms is about 3 atomic percent.

6. An apparatus as recited in claim 4, wherein a concentration of dopant Thulium atoms is less than 3 atomic percent.

7. An apparatus as recited in claim 4, wherein a concentration of dopant Thulium atoms is less than about 0.5 atomic percent.

8. An apparatus as recited in claim 4, wherein:
an average number designated x of Lutetium atoms per molecule of Aluminum Garnet is less than 3;
an average number of Yttrium atoms per molecule of Aluminum Garnet is substantively equal to 3-x; and
x is in a range from about 0.1 to about 2.9.

9. An apparatus as recited in claim 4, further comprising:
at least one processor; and
at least one memory including one or more sequences of instructions,
the at least one memory and the one or more sequences of instructions are configured to, with the at least one processor, cause the apparatus to perform at least the following,
cause the doped crystal to be illuminated by the incident optical electromagnetic radiation derived from the source; and
detect optical electromagnetic radiation emitted from the doped crystal.

10. A method comprising:
mounting a doped crystal in a cryocooler, wherein the doped crystal comprises Thulium doped into a host crystal of Yttrium Lutetium Aluminum Garnet;
maintaining inside the cryocooler an operating temperature in a range from about 3 Kelvin to about 6 Kelvin;
causing the doped crystal to be illuminated by incident optical electromagnetic radiation derived from a source; and
detecting optical electromagnetic radiation emitted from the doped crystal.

* * * * *